United States Patent
Chu

(10) Patent No.: US 10,581,273 B2
(45) Date of Patent: Mar. 3, 2020

(54) WIRELESS CHARGING RECEIVER GROUP AUTHENTICATION

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 270 days.

(21) Appl. No.: 15/394,838

(22) Filed: Dec. 30, 2016

(65) Prior Publication Data

US 2018/0191190 A1 Jul. 5, 2018

(51) Int. Cl.
| | | |
|---|---|---|
| *H02J 7/00* | (2006.01) | |
| *H02J 50/10* | (2016.01) | |
| *H04B 5/00* | (2006.01) | |
| *H02J 50/20* | (2016.01) | |
| *H02J 50/80* | (2016.01) | |
| *H02J 7/02* | (2016.01) | |

(52) U.S. Cl.
CPC .............. *H02J 50/10* (2016.02); *H02J 7/025* (2013.01); *H02J 50/20* (2016.02); *H02J 50/80* (2016.02); *H04B 5/0031* (2013.01); *H04B 5/0037* (2013.01); *H02J 2007/0001* (2013.01)

(58) Field of Classification Search
CPC ................................. H02J 50/10; H02J 50/80
USPC ........................................... 320/108; 307/104
See application file for complete search history.

(56) References Cited

U.S. PATENT DOCUMENTS

| | | |
|---|---|---|
| 2005/0215233 A1 | 9/2005 | Perera |
| 2010/0264746 A1* | 10/2010 | Kazama ................. H02J 7/025 307/104 |
| 2012/0268238 A1* | 10/2012 | Park ...................... G07F 15/006 340/5.8 |
| 2012/0326524 A1 | 12/2012 | Matsumoto |

OTHER PUBLICATIONS

Search Report dated Aug. 21, 2017 for EP application No. 16207491. 8, pp. 1-11.
System Description Wireless Power Transfer, vol. I: Low Power, Part 1: Interface Definition, Version 1.1.2, Jun. 2013, XP007923140, p. 1-186, Wireless Power Consortium.

* cited by examiner

*Primary Examiner* — Zixuan Zhou
(74) *Attorney, Agent, or Firm* — Winston Hsu

(57) ABSTRACT

The present invention provides a mobile apparatus with wireless charging function and an accessory apparatus with wireless charging function capable of allowing a wireless power receiver (PRX) to communicate with a CPU of a mobile device, so as to solve the problem mentioned above. The mobile apparatus comprises: a processing circuit and a wireless power receiver (PRX). The PRX is coupled to the processing circuit and wirelessly connected to a wireless power transmitter (PTX) of a wireless charger, for receiving a wireless power, wherein the PRX receives a first authentication request signal from the PTX and then sends a second authentication request signal to the processing circuit, and the processing circuit sends a second authentication information to the PRX, and the PRX sends a first authentication information to the PTX.

10 Claims, 4 Drawing Sheets

… (1)

WIRELESS CHARGING RECEIVER GROUP AUTHENTICATION

BACKGROUND OF THE INVENTION

1. Field of the Invention

The present invention relates to a mobile apparatus and an accessory apparatus with wireless charging function, and more particularly, to a mobile apparatus and an accessory apparatus with wireless charging function capable of allowing a wireless power receiver (PRX) to communicate with a CPU of a mobile device.

2. Description of the Prior Art

Wireless Power Consortium (WPC) and air fuel alliance (AFA) are two leading organizations in the world for developing wireless charging standard. The document "The Qi Wireless Power Transfer System—Power Class 0 Specification" released in April 2016 describes the interaction between a wireless power transmitter (PTX) and a wireless power receiver (PRX). In commercial wireless power systems, the PRX designed for a smart phone usually has no way to communicate with a CPU of the smart phone. It means, if the authentication is required, the PRX has to generate a reliable password by itself and sent it to the PTX.

SUMMARY OF THE INVENTION

It is therefore one of the objectives of the disclosure to provide a mobile apparatus with wireless charging function and an accessory apparatus with wireless charging function capable of allowing a wireless power receiver (PRX) to communicate with a CPU of a mobile device, so as to solve the problem mentioned above.

In accordance with an example of the present invention, a mobile apparatus with wireless charging function is disclosed. The mobile apparatus comprises: a processing circuit and a wireless power receiver (PRX). The PRX is coupled to the processing circuit and wirelessly connected to a wireless power transmitter (PTX) of a wireless charger, for receiving a wireless power, wherein the PRX receives a first authentication request signal from the PTX and then sends a second authentication request signal to the processing circuit, and the processing circuit sends a second authentication information to the PRX, and the PRX sends a first authentication information to the PTX.

In accordance with an example of the present invention, an accessory apparatus with wireless charging function is disclosed. The accessory apparatus comprises: a wireless power receiver (PRX). The PRX is coupled to a mobile apparatus and wirelessly connected to a wireless power transmitter (PTX) of a wireless charger, for receiving a wireless power, wherein the PRX receives a first authentication request signal from the PTX and then sends a second authentication request signal to the mobile apparatus, and the PRX further receives a second authentication information from the mobile apparatus and then sends a first authentication information to the PTX.

Briefly summarized, the remote management system and the remote management method for wireless charging disclosed by the present invention are capable of allowing a PRX to communicate with a CPU of a mobile device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
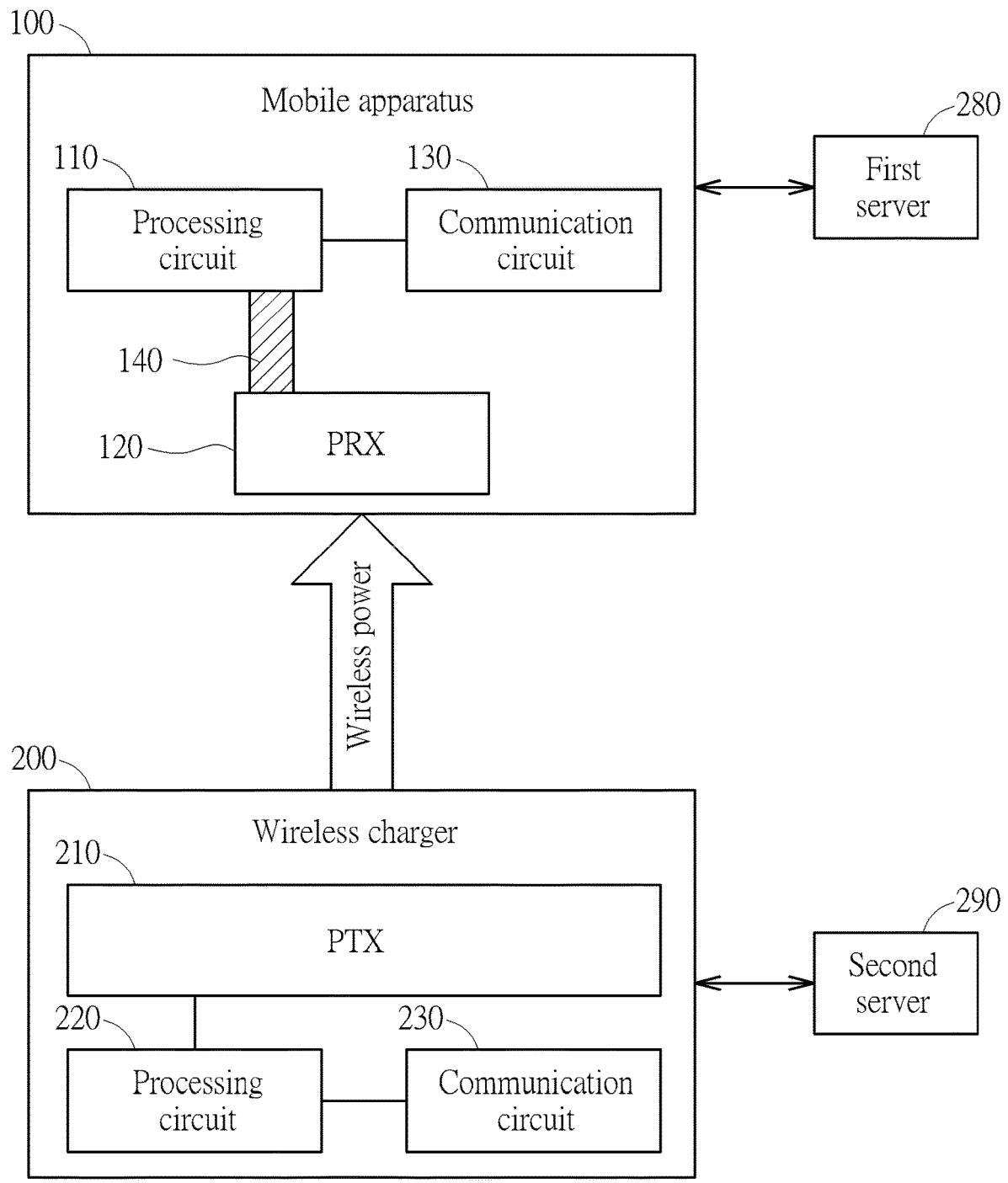
FIG. 1 is a simplified block diagram of a mobile apparatus with wireless charging function in accordance with a first example of the present invention.
Figure 2:
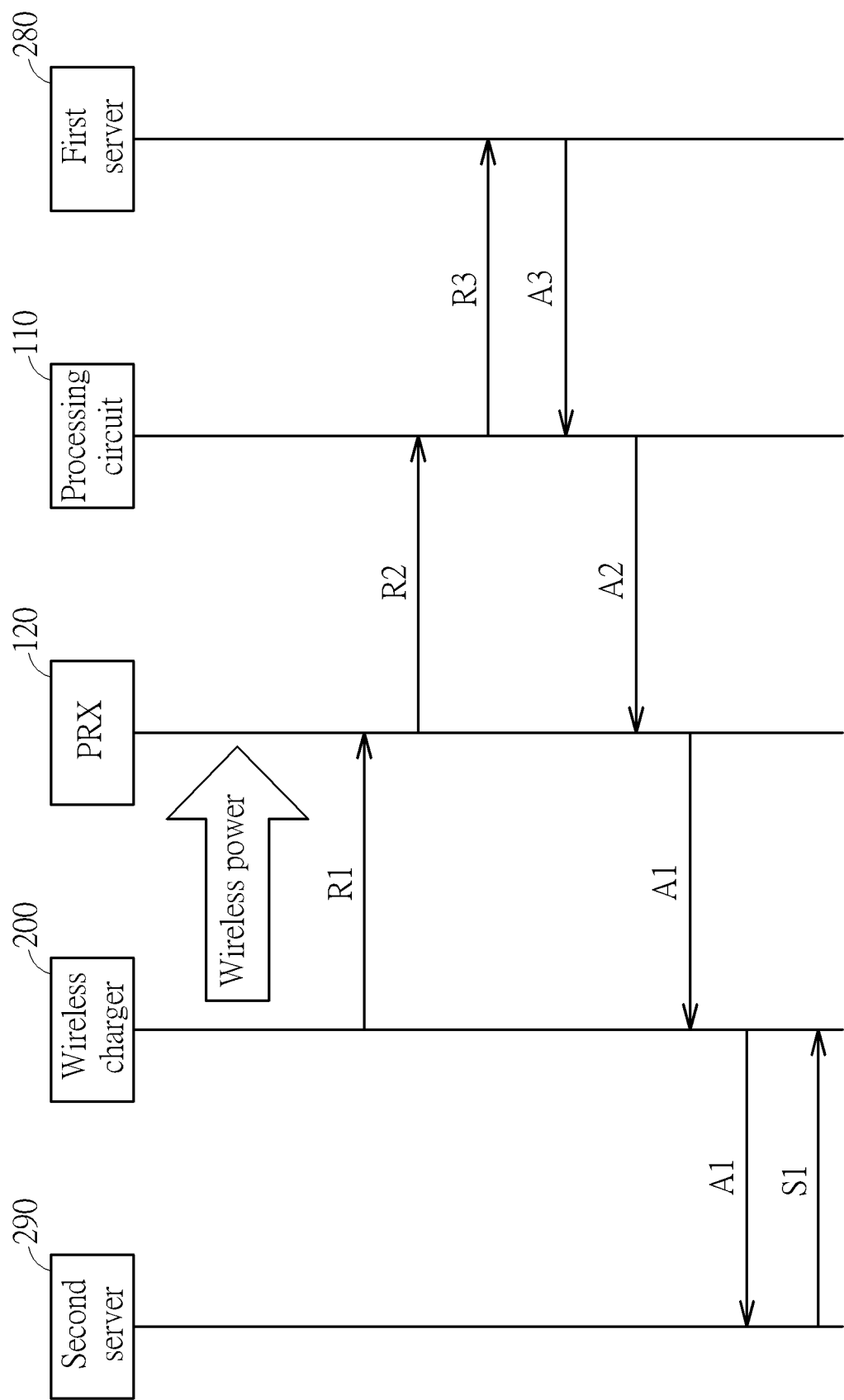
FIG. 2 is a simplified diagram of a signal flow in accordance with the first example in FIG. 1 of the present invention.

Please refer to FIG. 1 and FIG. 2 together. FIG. 1 is a simplified block diagram of a mobile apparatus 100 with wireless charging function in accordance with a first example of the present invention, wherein the mobile apparatus 100 may be a mobile phone, a tablet, a personal digital assistant (PDA), a lap top computer, a digital camera, a music player, a game device, or any other device with a processor. FIG. 2 is a simplified diagram of a signal flow in accordance with the first example of the present invention. As shown in FIG. 1, the mobile apparatus 100 comprises: a processing circuit 110, a wireless power receiver (PRX) 120, and a communication circuit 130, wherein the processing circuit 110 may be a CPU and comprise a processor, a memory, and a communication circuit, and the PRX 120 may be a wireless power reception module defined by the Wireless Power Consortium (WPC) specification, which consists of a coil, an analog circuit (e.g. a rectifier) and a control IC. The PRX 120 is coupled to the processing circuit 110 and wirelessly connected to a wireless power transmitter (PTX) 210 of a wireless charger 200, wherein the PTX 210 may be a wireless power transmission module defined by the WPC specification, which consists of a coil, an analog circuit (e.g. a matching circuit) and a control IC, and the PRX 120 may be coupled to the processing circuit 110 via a bus 140. In addition, the wireless charger 200 may be a device which includes a wireless power transmission module or further includes other modules such as a BLE module or a LCD module. For example, the wireless charger 200 may be a wireless charging pad.

As shown in FIG. 2, The PTX 210 may provide a wireless power to the PRX 120 to initiate an In-band communication so that the PTX 210 send a first authentication request signal R1 to the PRX 120 (i.e. the PRX 120 receives the wireless power and the first authentication request signal R1 from the PTX 210), wherein the In-band communication means the communication signal is attached on the wireless power signal. For example, the In-band communication may be the Load Modulation and FSK defined in the WPC specification. In addition, the first authentication request signal R1 may be just a bit. Next, the PRX 120 will send a second authentication request signal R2 to the processing circuit 110, wherein the second authentication request signal R2 may include a bit and an ID of the PRX 120.

In addition, the communication circuit 130 is coupled to the processing circuit 110, and utilized for sending a third authentication request signal R3 to a first server 280, wherein the third authentication request signal R3 may include a bit, the ID of the PRX 120 and an ID of the mobile apparatus 100. Next, the first server 280 will send a third authentication information A3 according to the third authentication request signal R3 to the communication circuit 130 of the mobile apparatus 100, wherein the third authentication information A3 may include a password, the ID of the PRX 120 and the ID of the mobile apparatus 100. Next, the processing circuit 110 of the mobile apparatus 100 will send a second authentication information A2 to the PRX 120, wherein the second authentication information A2 may include the password and the ID of the PRX 120. Next, the PRX 120 will send a first authentication information A1 to the PTX 210, wherein the first authentication information A1 may be only the password. Please note that the formats and encoding schemes of the first authentication request signal R1, the second authentication request signal R2, and the third authentication request signal R3 may be different according to different design requirement, and the formats and encoding schemes of the first authentication information A1, the second authentication information A2 and the third authentication information A3 also may be different according to different design requirement.

In addition, the wireless charger 200 may further comprise a processing circuit 210. In one example, the processing circuit 210 may control the wireless charger 200 whether to keep or stop providing the wireless power, and in another example, the processing circuit 210 may adjust a power level of the wireless power according to the first authentication information A1. For example, the processing circuit 210 may determine to select a fast charging mode, a normal charging mode, or a slow charging mode for charging the different mobile apparatuses with different access authorities according to the first authentication information A1.

In another example, the wireless charger 200 also may be integrated in a light device or an electronic device (such as a control device integrated in a car or a home appliance), and the processing circuit 110 can control the light device or the electronic device according to the first authentication information A1. For example, the processing circuit 110 can control the light device or the electronic device to turn on or turn off.

In addition, if the wireless charger 200 does not have a enough memory space for storing data corresponding to the first authentication information A1 for identifying the different mobile apparatuses with different access authorities, the wireless charger 200 may further comprise a communication circuit 230 for sending the first authentication information A1 to a second server 290, and the second server 290 will respond with a feedback signal S1 to the wireless charger 200. In one example, the second server 290 may respond with the feedback signal S1 to control the wireless charger 200 whether to keep or stop providing the wireless power, or adjust a power level of the wireless power according to the first authentication information A1. For example, the second server 290 may respond with the feedback signal S1 to control the wireless charger 200 to determine to select a fast charging mode, a normal charging mode, or a slow charging mode for charging the different mobile apparatuses with different access authorities according to the first authentication information A1.

In another example, the wireless charger 200 also may be integrated in a light device or an electronic device (such as a control device integrated in a car or a home appliance), and the second server 290 may respond with the feedback signal S1 to control the light device or the electronic device according to the first authentication information A1. For example, the second server 290 may respond with the feedback signal S1 to control the light device or the electronic device to turn on or turn off. Please note that the above example is only for an illustrative purpose and is not meant to be a limitation of the present invention. For example, the first server 280 and the second server 290 may be one and the same, that is, the first server 280 and the second server 290 may be combined to one server according to different design requirement.

Figure 3:
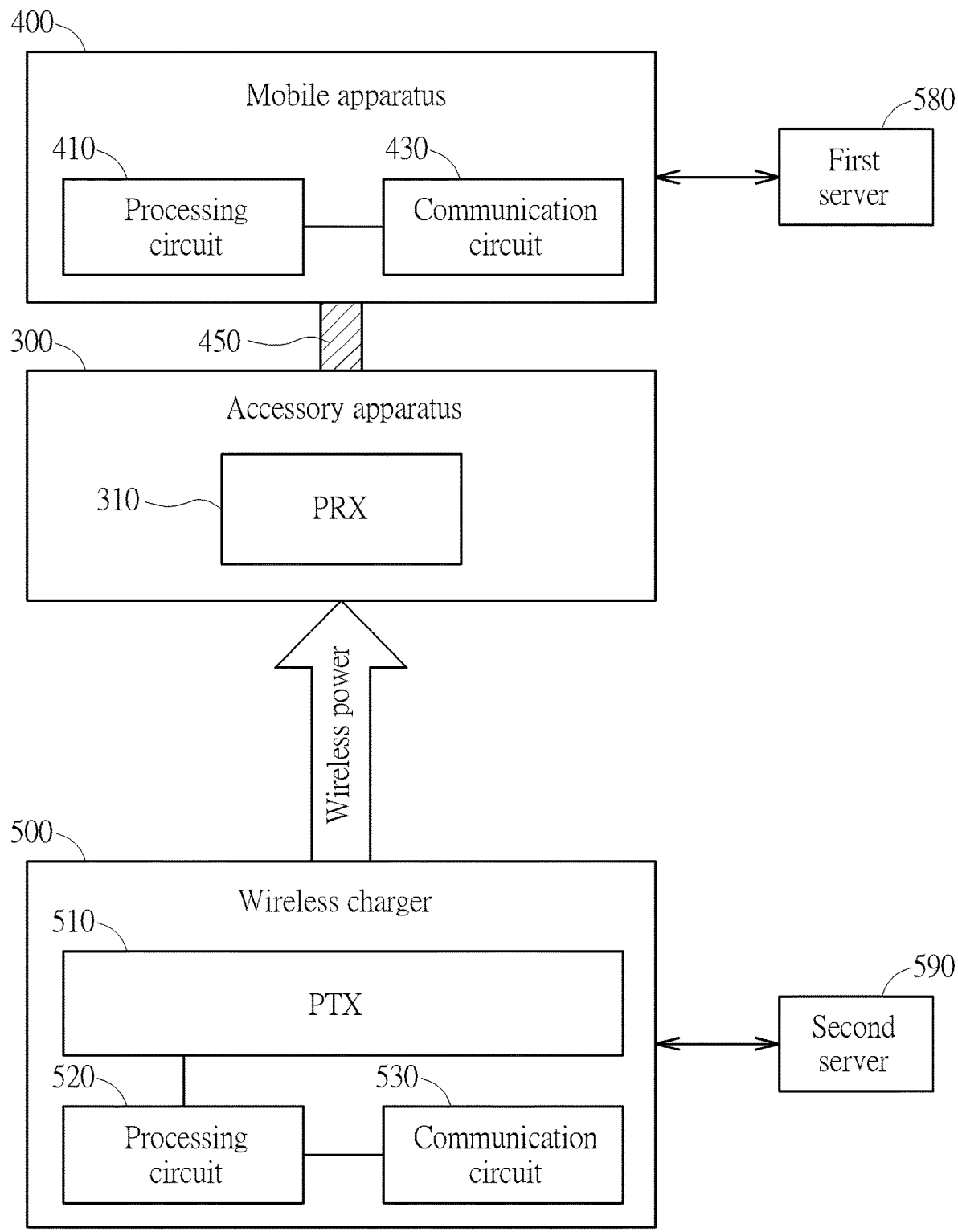
FIG. 3 is a simplified block diagram of a mobile apparatus with wireless charging function in accordance with a second example of the present invention.
Figure 4:
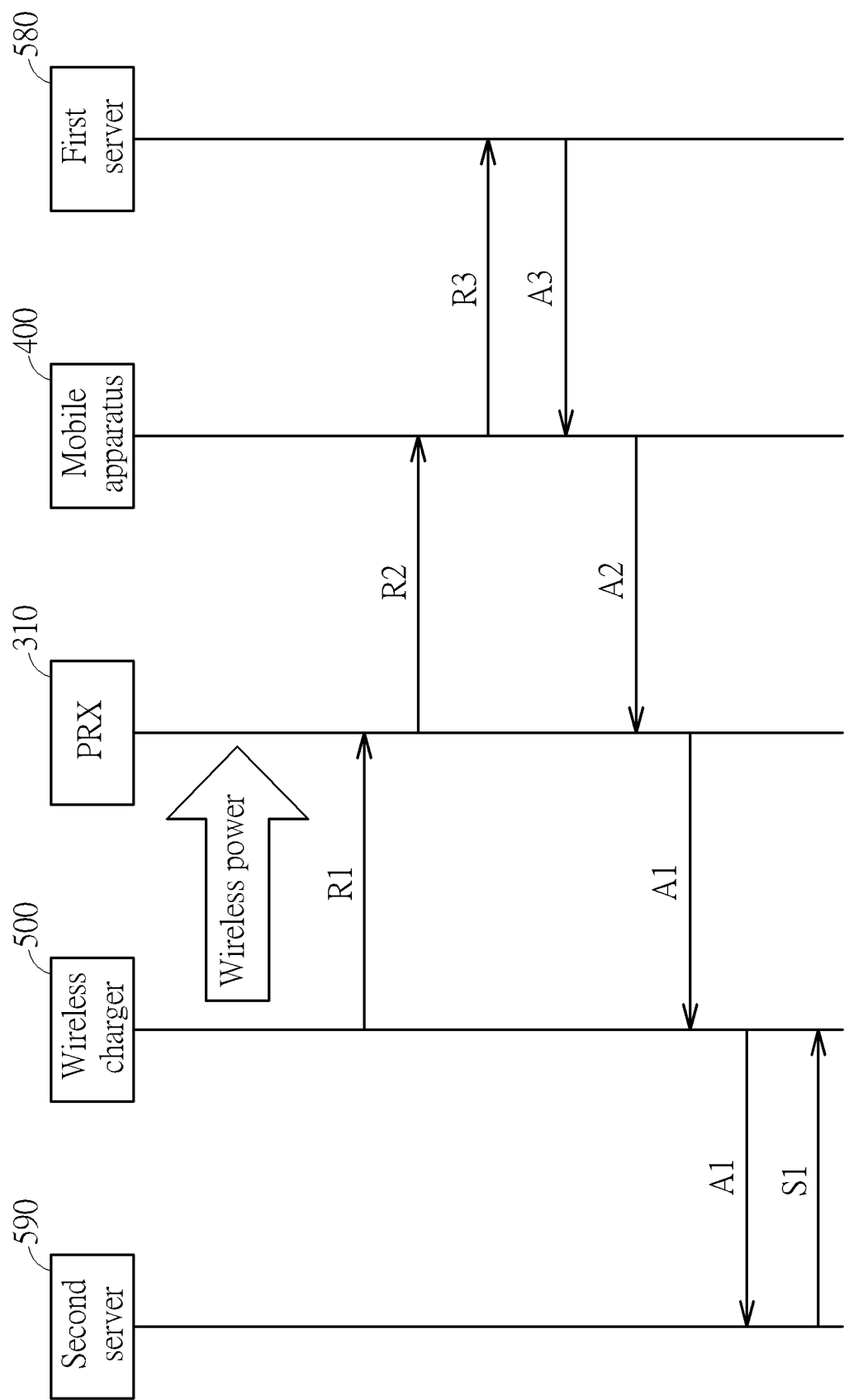
FIG. 4 is a simplified diagram of a signal flow in accordance with the second example in FIG. 3 of the present invention.

Please refer to FIG. 3 and FIG. 4 together. FIG. 3 is a simplified block diagram of an accessory apparatus 300 with wireless charging function in accordance with a second example of the present invention. FIG. 4 is a simplified diagram of a signal flow in accordance with the first example of the present invention. As shown in FIG. 3, the accessory apparatus 300 comprises a wireless power receiver (PRX) 310, wherein the PRX 310 may be coupled to a mobile apparatus 400 via a connecting cable 450 such as a Micro-USB cable, a Lightening cable, or a USB type C cable, and the PRX 310 may be a wireless power reception module defined by the Wireless Power Consortium (WPC) specification, which consists of a coil, an analog circuit (e.g. a rectifier) and a control IC. The PRX 310 may be coupled to a processing circuit 410 of the mobile apparatus 400 and wirelessly connected to a wireless power transmitter (PTX) 510 of a wireless charger 500, wherein the PTX 510 may be a wireless power transmission module defined by the WPC specification, which consists of a coil, an analog circuit (e.g. a matching circuit) and a control IC, and the processing circuit 410 may be a CPU and comprise a processor, a memory, and a communication circuit. In addition, the wireless charger 200 may be a device which includes a wireless power transmission module or further includes other modules such as a BLE module or a LCD module. For example, the wireless charger 200 may be a wireless charging pad. In addition, the mobile apparatus 400 may be a mobile phone, a tablet, a personal digital assistant (PDA), a lap top computer, a digital camera, a music player, a game device, or any other device with a processor.

As shown in FIG. 4, The PTX 510 may provide a wireless power to the PRX 310 to initiate an In-band communication so that the PTX 510 send a first authentication request signal R1 to the PRX 310 (i.e. the PRX 310 receives the wireless power and the first authentication request signal R1 from the PTX 510), wherein the In-band communication means the communication signal is attached on the wireless power signal. For example, the In-band communication may be the Load Modulation and FSK defined in the WPC specification. In addition, the first authentication request signal R1 may be just a bit. Next, the PRX 310 will send a second authentication request signal R2 to the mobile apparatus 400 (or to the processing circuit 410 of mobile apparatus 400), wherein the second authentication request signal R2 may include a bit and an ID of the PRX 310.

In addition, the communication circuit 430 is coupled to the processing circuit 410 as shown in FIG. 3, and utilized for sending a third authentication request signal R3 to a first server 580, wherein the third authentication request signal R3 may include a bit, the ID of the PRX 310 and an ID of the mobile apparatus 400. Next, the first server 580 will send a third authentication information A3 according to the third authentication request signal R3 to the communication circuit 430 of the mobile apparatus 400, wherein the third authentication information A3 may include a password, the ID of the PRX 310 and the ID of the mobile apparatus 400. Next, the mobile apparatus 400 (or the processing circuit 410 of the mobile apparatus 400) will send a second authentication information A2 to the PRX 310, wherein the second authentication information A2 may include the password and the ID of the PRX 310. Next, the PRX 310 will send a first authentication information A1 to the PTX 510, wherein the first authentication information A1 may be only the password. Please note that the formats and encoding schemes of the first authentication request signal R1, the second authentication request signal R2, and the third authentication request signal R3 may be different according to different design requirement, and the formats and encoding schemes of the first authentication information A1, the second authentication information A2 and the third authentication information A3 also may be different according to different design requirement.

In addition, the wireless charger 500 may further comprise a processing circuit 510. In one example, the processing circuit 510 may control the wireless charger 500 whether to keep or stop providing the wireless power, and in another example, the processing circuit 510 may adjust a power level of the wireless power according to the first authentication information A1. For example, the processing circuit 510 may determine to select a fast charging mode, a normal charging mode, or a slow charging mode for charging the different mobile apparatuses with different access authorities according to the first authentication information A1.

In another example, the wireless charger 500 also may be integrated in a light device or an electronic device (such as a control device integrated in a car or a home appliance), and the processing circuit 510 can control the light device or the electronic device according to the first authentication information A1. For example, the processing circuit 510 can control the light device or the electronic device to turn on or turn off.

In addition, if the wireless charger 500 does not have a enough memory space for storing data corresponding to the first authentication information A1 for identifying the different mobile apparatuses with different access authorities, the wireless charger 500 may further comprise a communication circuit 530 for sending the first authentication information A1 to a second server 590, and the second server 590 will respond with a feedback signal S1 to the wireless charger 500. In one example, the second server 590 may respond with the feedback signal S1 to control the wireless charger 500 whether to keep or stop providing the wireless power, or adjust a power level of the wireless power according to the first authentication information A1. For example, the second server 590 may respond with the feedback signal S1 to control the wireless charger 500 to determine to select a fast charging mode, a normal charging mode, or a slow charging mode for charging the different mobile apparatuses with different access authorities according to the first authentication information A1.

In another example, the wireless charger 500 also may be integrated in a light device or an electronic device (such as a control device integrated in a car or a home appliance), and the second server 590 may respond with the feedback signal S1 to control the light device or the electronic device according to the first authentication information A1. For example, the second server 590 may respond with the feedback signal S1 to control the light device or the electronic device to turn on or turn off. Please note that the above example is only for an illustrative purpose and is not meant to be a limitation of the present invention. For example, the first server 580 and the second server 590 may be one and the same, that is, the first server 580 and the second server 590 may be combined to one server according to different design requirement.

Briefly summarized, the remote management system and the remote management method for wireless charging disclosed by the present invention are capable of allowing a PRX to communicate with a CPU of a mobile device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile apparatus with wireless charging function, comprising:
 a processing circuit; and
 a wireless power receiver (PRX) of the mobile apparatus, coupled to the processing circuit of the mobile apparatus and wirelessly connected to a wireless power transmitter (PTX) of a wireless charger, for receiving a wireless power, wherein the PRX receives a first authentication request signal from the PTX and then sends a second authentication request signal related to the first authentication request signal and comprising an ID of the PRX to the processing circuit, and in response to the second authentication request signal the processing circuit sends a second authentication information to the PRX, the second authentication information comprising a password and the ID of the PRX, and in response to the first authentication request signal and the second authentication information the PRX sends a first authentication information to the PTX, the first authentication information comprising the password;
 wherein the wireless charger determines to continue or stop providing power to the mobile apparatus according to the password.

2. The mobile apparatus of claim 1, further comprising:
 a communication circuit, coupled to the processing circuit, for sending a third authentication request signal related to the second authentication request signal and the first authentication request signal and comprising an ID of the mobile apparatus to a first server not coupled to the wireless charger, wherein the first server sends a third authentication information according to the third authentication request signal to the communication circuit, the third authentication information comprising the password, the ID of the PRX and the ID of the mobile apparatus.

3. The mobile apparatus of claim 1, wherein the wireless charger further comprises a processing circuit, and the processing circuit controls the wireless charger whether to keep or stop providing the wireless power, or adjust a power level of the wireless power according to the first authentication information.

4. The mobile apparatus of claim 3, wherein the wireless charger is integrated in a light device or an electronic device, and the processing circuit controls the light device or the electronic device according to the first authentication information.

5. The mobile apparatus of claim 1, wherein the wireless charger further comprises a communication circuit for sending the first authentication information to a second server, and the second server responds with a feedback signal to the wireless charger.

6. The mobile apparatus of claim 5, wherein the second server responds with the feedback signal to control the wireless charger whether to keep or stop providing the wireless power, or adjust a power level of the wireless power according to the first authentication information.

7. The mobile apparatus of claim 5, wherein the wireless charger is integrated in a light device or an electronic device, and the second server responds with the feedback signal to control the light device or the electronic device according to the first authentication information.

8. The mobile apparatus of claim 5, wherein the first server and the second server are one and the same.

9. The mobile apparatus of claim 1, wherein the PRX is coupled to the processing circuit via a bus.

10. The mobile apparatus of claim 1, wherein the processing circuit further comprises:
a processor, a memory, and a communication circuit.

* * * * *